(12) United States Patent
Onuma

(10) Patent No.: US 10,661,762 B2
(45) Date of Patent: May 26, 2020

(54) CAMERA CLEANING DEVICE

(71) Applicant: TOYOTA JIDOSHA KABUSHIKI KAISHA, Toyota-shi, Aichi-ken (JP)

(72) Inventor: Masahiko Onuma, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 59 days.

(21) Appl. No.: 16/012,232

(22) Filed: Jun. 19, 2018

(65) Prior Publication Data
US 2019/0111895 A1 Apr. 18, 2019

(30) Foreign Application Priority Data
Oct. 12, 2017 (JP) .................. 2017-198200

(51) Int. Cl.
| | |
|---|---|
| *B60S 1/56* | (2006.01) |
| *B60R 13/04* | (2006.01) |
| *B60S 1/52* | (2006.01) |
| *B08B 3/02* | (2006.01) |
| *B08B 3/04* | (2006.01) |
| *B60S 1/46* | (2006.01) |
| *G02B 27/00* | (2006.01) |

(52) U.S. Cl.
CPC .................. *B60S 1/56* (2013.01); *B08B 3/02* (2013.01); *B08B 3/04* (2013.01); *B60R 13/04* (2013.01); *B60S 1/46* (2013.01); *B60S 1/52* (2013.01); *G02B 27/0006* (2013.01)

(58) Field of Classification Search
CPC ....................................................... B60S 1/56
See application file for complete search history.

(56) References Cited

U.S. PATENT DOCUMENTS

2013/0092758 A1    4/2013   Tanaka et al.

FOREIGN PATENT DOCUMENTS

| JP | 2013-6481 A | 1/2013 |
| JP | 2013-100077 A | 5/2013 |

*Primary Examiner* — Jason Y Ko
(74) *Attorney, Agent, or Firm* — Sughrue Mion, PLLC

(57) ABSTRACT

A camera cleaning device includes: a jet nozzle being placed above a lens of the camera, the jet nozzle being configured to dispersedly jet washing water toward the lens; and a garnish fixed to an outer panel so as to be placed on a rear side of the outer panel in a vehicle front-rear direction, wherein the jet nozzle is disposed between the outer panel and the garnish.

8 Claims, 3 Drawing Sheets

CAMERA CLEANING DEVICE

INCORPORATION BY REFERENCE

The disclosure of Japanese Patent Application No. 2017-198200 filed on Oct. 12, 2017 including the specification, drawings and abstract is incorporated herein by reference in its entirety.

BACKGROUND

1. Technical Field

The disclosure relates to a camera cleaning device configured to clean a lens of a camera provided at a rear door of the vehicle.

2. Description of Related Art

JP 2013-100077 A discloses a camera cleaning device for a camera provided at a vehicle rear door. That is, a camera is fixed to an outer panel of a rear door (back door) of a vehicle in JP 2013-100077 A. The camera includes: a camera case fixed to the rear door; a lens supported by the camera case and exposed on the rear face of the camera case; and a jet nozzle integrated with the camera case and open on the rear face of the camera case.

When a light reflected by a subject placed behind the rear door is incident on the lens, the subject is displayed on a display provided inside a vehicle, for example.

A washing water passage is formed inside the camera case such that its first end is connected to the jet nozzle and its second end is connected to a washing water tank via a pump. For example, when the pump operates at a time when foreign objects or impurities are attached to a surface of the lens, washing water in the washing water tank is pressurized and supplied to the jet nozzle via the washing water passage. Hereby, high-pressure washing water is jetted outside from the jet nozzle. As a result, the washing water thus jetted is partially directed toward the camera, so that the foreign objects or impurities are removed from the lens by the washing water.

SUMMARY

However, in JP 2013-100077 A, washing water is jetted from the jet nozzle dispersedly. That is, the jet nozzle cannot control a jet direction of the washing water accurately. Therefore, the washing water jetted from the jet nozzle is only partially directed toward the lens. In other words, the rest of the washing water thus jetted is jetted toward parts other than the lens of the vehicle, for example. Accordingly, the washing water is not used effectively in JP 2013-100077 A.

Besides, the jet nozzle is exposed rearward on the outer face (rear face) of the outer panel. The jet nozzle accordingly spoils the appearance of the rear door and is not suitably protected against mechanical influences such as collision on the vehicle rearward side.

The disclosure provides a camera cleaning device for a camera provided at a vehicle rear door, the camera cleaning device being configured to efficiently clean a lens of the camera by washing water jetted from a jet nozzle.

An aspect of the disclosure relates to a camera cleaning device provided at a vehicle rear door of a vehicle for a camera configured to capture an image of a subject placed behind the vehicle, the camera being fixed to an outer panel constituting an outer surface of the vehicle rear door, the camera cleaning device including: a jet nozzle being placed above a lens of the camera and being fixed to the outer panel, the jet nozzle being configured to dispersedly jet washing water toward the lens; and a garnish fixed to the outer panel so as to be placed on a rear side of the outer panel in a vehicle front-rear direction, wherein the jet nozzle is disposed between the outer panel and the garnish.

In the camera cleaning device according to the aspect, when the washing water is dispersedly jetted from the jet nozzle, part of the washing water thus jetted directly reaches the lens. Further, part of the rest of the washing water thus jetted is reflected by the garnish and then reaches the lens. Accordingly, although the washing water is dispersedly jetted from the jet nozzle, a ratio of the washing water that reaches the lens with respect to the whole washing water thus jetted is high. In other words, it is possible to efficiently clean the lens of the camera by the washing water jetted from the jet nozzle.

Further, with the camera cleaning device of the aspect, rearward exposure of the jet nozzle is prevented by the garnish. This accordingly protects the jet nozzle against mechanical influences on the vehicle rearward side.

In the above aspect, the garnish may include a lower end which is inclined so as to protrude towards an upper part of the lens.

In the above aspect, a surface on a front side of a lower end of the garnish in the vehicle front-rear direction may face the jet nozzle; and a shape of the garnish may be configured such that the lens is placed on a virtual downwardly and forwardly extending extension line of the lower end.

In the camera cleaning device according to the aspect, the washing water jetted from the jet nozzle and hitting the inner surface of the lower end of the garnish easily reaches the lens. Accordingly, it is possible to more efficiently clean the lens of the camera by the washing water jetted from the jet nozzle.

In the above aspect, the lower end of the garnish and the upper part of the lens may face each other in the vehicle front-rear direction.

In the above aspect, the jet nozzle may be arranged above the lower end of the garnish. The surface on the front side of the lower end of the garnish in the vehicle front-rear direction may face the jet nozzle such that a part of the washing water dispersedly jetted by the jet nozzle is reflected by the surface.

In the above aspect, the jet nozzle, the lens and the lower end of the garnish may be configured and arranged such that a first part of the washing water directly reaches the lens, a second part of the washing water is reflected towards the lens by the lower end of the garnish and a third part of the washing water is temporally accumulated in a space between the jet nozzle and the lower end of the garnish.

In the above aspect, the garnish may include a main portion extending in an upward and downward direction in a side view of the vehicle and the lower end. The lower end may include a first inclined portion being inclined with respect to the main portion and a second inclined portion being inclined with respect to the main portion and with respect to the first inclined portion.

In the above aspect, the garnish may be configured and arranged so as to enclose the jet nozzle on a vehicle rearward side and at least partly on a vehicle downward side.

In the above aspect, the lower end of the garnish and the lens may be arranged such with respect to each other that the lower end of the garnish is above and outside an angle of view of the lens In the above description, in order to assist understanding of the disclosure, a name used in an embodiment described below is added in parenthesis to a constituent of the disclosure corresponding to the embodiment. However, each constituent feature of the disclosure is not limited to the embodiment defined by the name. Other objects, other features, and accompanied advantages of the embodiments will be easily understood from the description about the embodiment of the disclosure to be described with reference to the drawings.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following will describe a camera cleaning device for a rear door according to an embodiment of the disclosure with reference to the attached drawings. In the embodiment, in some occasions, "front of a vehicle or "front side of a vehicle" are simply referred to as "front" or "front side", and "rear of a vehicle" or "rear side of a vehicle" are simply referred to as "rear" or "rear side".

Figure 1:
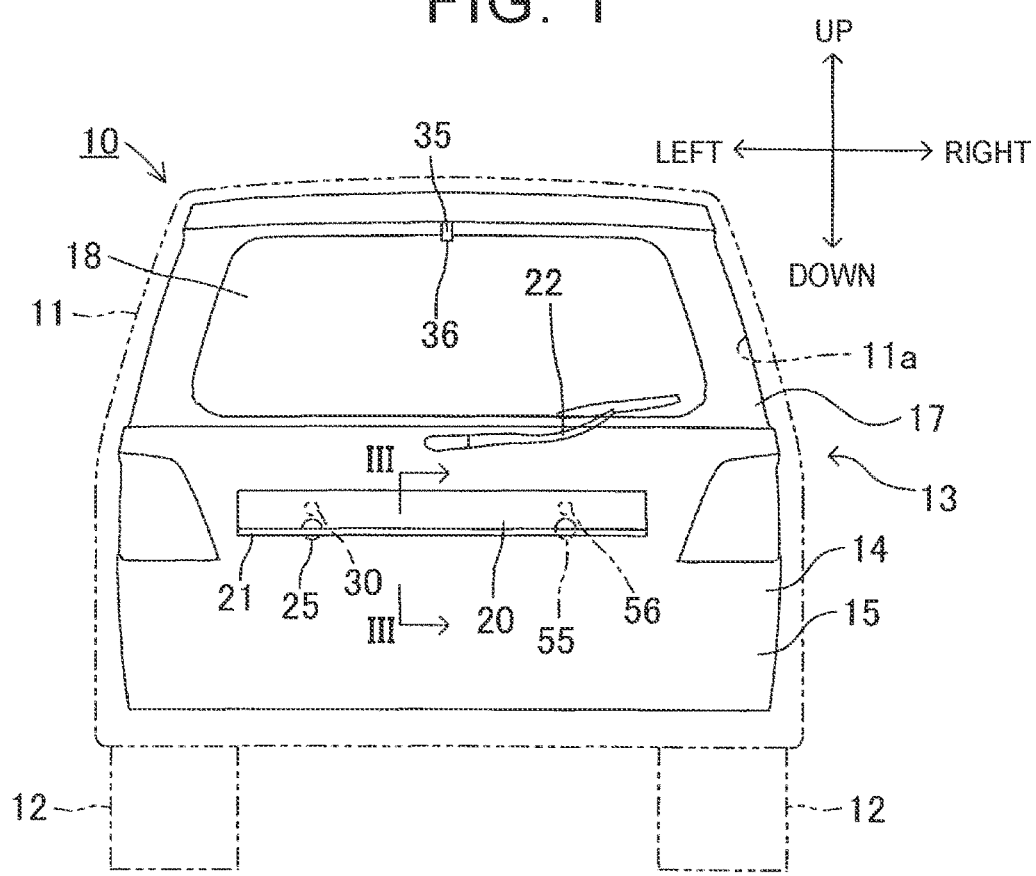
FIG. 1 is a rear view of a vehicle including a camera cleaning device according to an embodiment of the disclosure.
Figure 2:
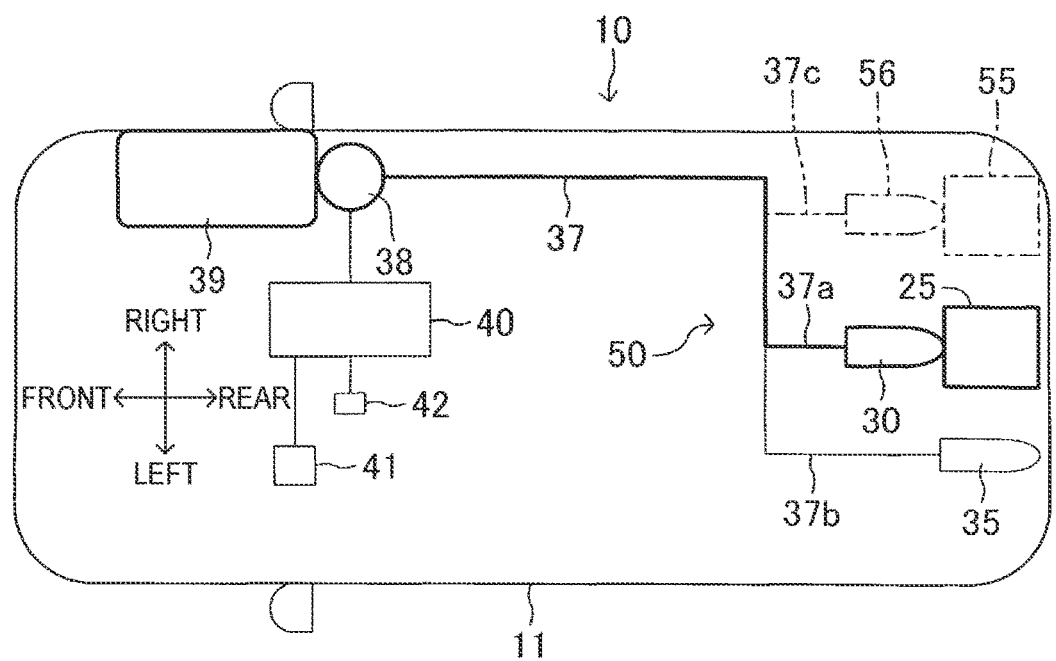
FIG. 2 is a schematic plan view of the vehicle.

A vehicle 10 illustrated in FIGS. 1 and 2 includes a vehicle body 11 and four wheels 12 (only right and left rear wheels are illustrated in FIG. 1). A back opening 11a is formed on the back face of the vehicle body 11. A rear door 13 (back door) is provided at the back opening 11a.

Figure 3:
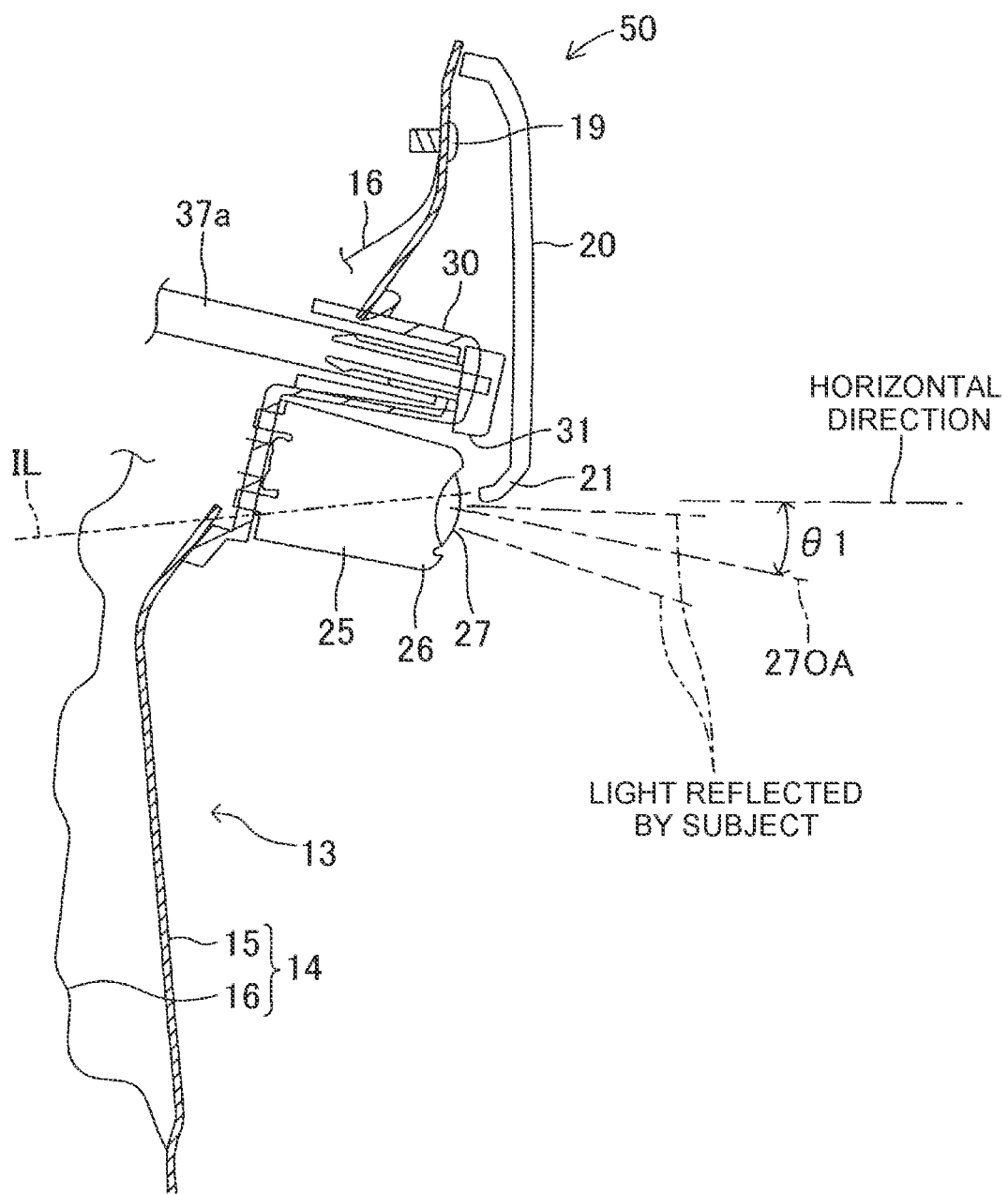
FIG. 3 is a sectional view of a rear door taken along a line III-III in FIG. 1.
Figure 4:
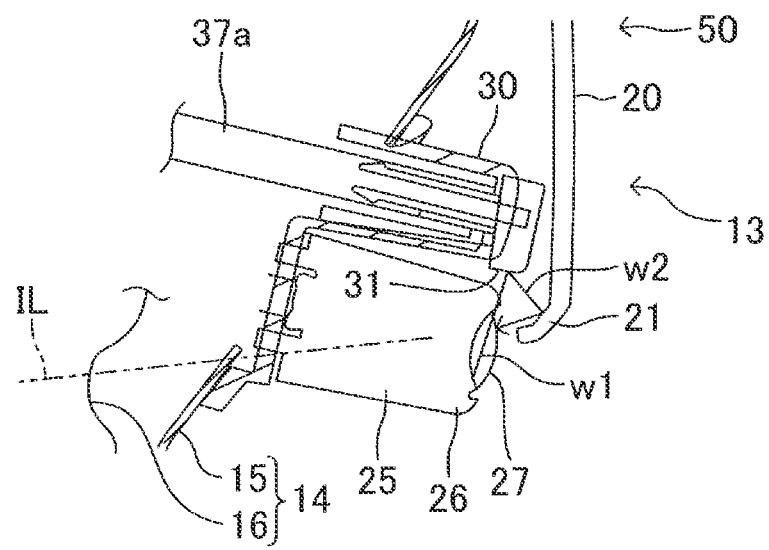
FIG. 4 is a sectional view of the rear door when washing water is jetted from a jet nozzle.
Figure 5:
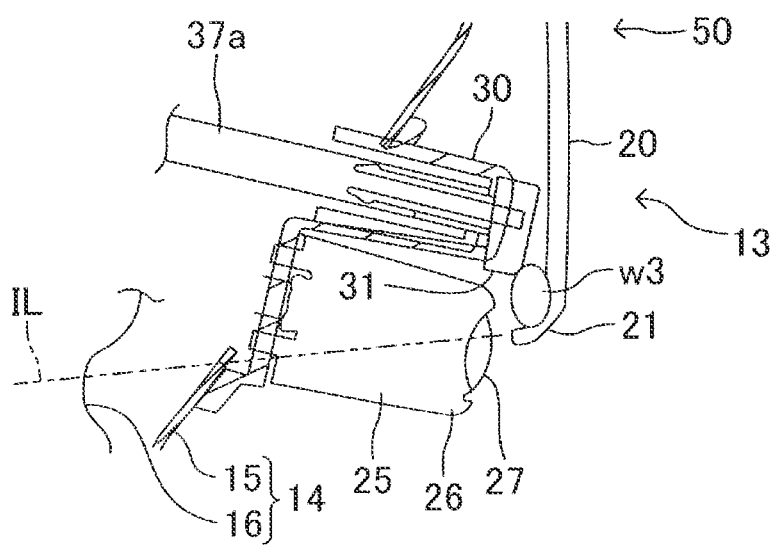
FIG. 5 is a sectional view similar to FIG. 4 when washing water is accumulated in a space between the jet nozzle and a garnish.

The rear door 13 includes a body portion 14 constituting the lower-half part of the rear door 13, a door sash 17 constituting the upper-half part of the rear door 13, and a rear window 18 provided in an opening formed between the body portion 14 and the door sash 17. Further, as illustrated in FIGS. 3 to 5, the body portion 14 includes a metal outer panel 15 constituting an outside part (rear part) of the body portion 14 in the vehicle front-rear direction, and a metal inner panel 16 placed just in front of the outer panel 15. As illustrated in FIG. 3, the outer panel 15 and the inner panel 16 are partially fixed to each other with a bolt 19. Further, as illustrated in FIG. 1 and FIGS. 3 to 5, an upper edge portion of a garnish 20 extending in the vehicle width direction (the right-left direction) is fixed to the outer face (rear face) of the outer panel 15. The garnish is an accessory attached to the vehicle, e.g., a decoration panel. A space is formed between a part of the garnish 20 except the upper edge portion and the outer panel 15. A lower end 21 of the garnish 20 is processed so as to be inclined from the up-down direction in a side view. Further, since the garnish 20 is placed just behind the bolt 19, the bolt 19 is prevented, by the garnish 20, from being exposed rearward. As illustrated in FIG. 1, a base end of a wiper 22 is rotatably supported by the outer panel 15.

As illustrated in FIGS. 1 to 5, a rear camera 25 is fixed to the outer face of the outer panel 15. The rear camera 25 includes: a camera case 26 fixed to the outer panel 15; a lens 27 fixed to the rear end of the camera case 26; and an imaging device (not shown) provided in the camera case 26. The imaging device may be, for example, an image sensor. As illustrated in FIG. 3, when a light reflected by a subject (not shown) placed behind the vehicle 10 (the rear door 13) is incident on the lens 27, the light passing through the lens 27 is received by the imaging device. Then, the imaging device sends imaging data to an image processor (not shown) and the image processor performs image processing on the basis of the imaging data. The image processor is connected to a display 41 fixed to an instrument panel (not shown) via a control device 40 illustrated in FIG. 2. Accordingly, an image showing the subject and subjected to the image processing by the image processor is displayed on the display 41. That is, the rear camera 25 is used as an electronic inner rearview mirror. In other words, the rear camera 25 is suitable for a camera for an electronic inner rearview mirror. Note that, as illustrated in FIG. 3, an angle $\theta1$ formed between an optical axis 270A of the lens 27 and the horizontal direction is relatively small (that is, the angle $\theta1$ is smaller than an angle formed between an optical axis of a rear camera 55 (described later) and the horizontal direction). That is, the rear camera 25 captures an image of a landscape (e.g., a road) behind the rear door 13 and a person, an object, and the like placed behind the rear door 13. Note that the control device is an electronic control unit (ECU), for example.

As illustrated in FIGS. 3 to 5, the garnish 20 is placed just behind the rear camera 25 such that the lower end 21 of the garnish 20 and the upper part of the lens 27 face each other in the front-rear direction. However, the sectional shape of the light incident on the lens 27 of the rear camera 25 is determined by the angle of view of the lens 27 and the lower end 21 of the garnish 20 is placed above the light incident on the lens 27, that is, above the angle of view as illustrated in FIG. 3. Accordingly, the garnish 20 (the lower end 21) is not displayed on the display 41. Further, in a side view, the lens 27 is placed on a virtual, downwardly and forwardly extending extension line IL of the lower end 21.

As illustrated in FIGS. 1 to 5, a camera jet nozzle 30 is fixed to the outer face of the outer panel 15. As illustrated in FIGS. 3 to 5, a jet port 31 is formed on a rear end of the bottom face of the camera jet nozzle 30. The camera jet nozzle 30 is placed just above the rear camera 25. That is, the jet port 31 of the camera jet nozzle 30 is placed above the lens 27 of the rear camera 25. Further, the garnish 20 is placed just behind the camera jet nozzle 30 such that the jet port 31 and the lower end 21 face each other via a very small gap formed therebetween. Accordingly, rearward exposure of the camera jet nozzle 30 is prevented by the garnish 20. This accordingly protects the jet nozzle 30 and prevents the appearance of the rear door 13 (and the vehicle 10) from being spoiled by the camera jet nozzle 30.

As illustrated in FIGS. 2 to 5, a first end of a first branch tube 37a is connected to the camera jet nozzle 30. The first branch tube 37a is a part of a water supply tube 37 illustrated in FIG. 2, and an end of the water supply tube 37 on the opposite side from the first branch tube 37a is connected to a washing water tank 39 via an electric pump 38. The washing water tank 39 is filled with washing water. Further, a cleaning switch 42 fixed to the instrument panel is connected to the control device 40.

Further, as illustrated in FIGS. 1 and 2, a window jet nozzle 35 is fixed to the top of the outer face of the door sash 17. A jet port 36 is formed on the bottom face of the window jet nozzle 35 such that the jet port 36 faces the outer face of the rear window 18. As illustrated in FIG. 2, a first end of a second branch tube 37b is connected to the window jet nozzle 35. The second branch tube 37b is a part of the water supply tube 37.

In the present embodiment, the garnish 20, the camera jet nozzle 30, the water supply tube 37, the electric pump 38, the washing water tank 39, the control device 40, and the cleaning switch 42 are constituents of the camera cleaning device 50.

For example, in a case where foreign objects or impurities are attached to a surface of the rear window 18 or the lens 27, when an occupant inside the vehicle 10 presses the cleaning switch 42 by hand, the cleaning switch 42 that has been placed at an OFF position is moved to an ON position. As long as the cleaning switch 42 is placed at the ON position, the control device 40 keeps transmitting an activating signal (electrical signal) to the electric pump 38. The electric pump 38 that receives the activating signal pressurizes washing water in the washing water tank 39, so as to send the washing water in the washing water tank 39 to the water supply tube 37 side. The washing water flowing from the washing water tank 39 to the water supply tube 37 then flows to the first branch tube 37a and to the second branch tube 37b. Hereby, the washing water is dispersedly jetted from the jet port 31 of the camera jet nozzle 30 and from the jet port 36 of the window jet nozzle 35.

The washing water jetted from the jet port 36 of the window jet nozzle 35 is sprayed to the outer face of the rear window 18. When the wiper 22 is rotated by use of power of a wiper motor (not shown) in the state where the washing water is present on the outer surface of the rear window 18, the foreign objects or impurities attached to the outer surface of the rear window 18 are removed by the wiper 22.

In the meantime, the washing water jetted from the jet port 31 of the camera jet nozzle 30 is dispersedly directed downward as illustrated in FIG. 4. Washing water W1 that is part of the washing water jetted at a high pressure directly reaches the lens 27. Washing water W2 that is part of the rest of the washing water jetted at the high pressure is reflected by the inner face of the lower end 21 of the garnish 20. As described above, since the lens 27 is placed on the virtual, downwardly and forwardly extending extension line IL of the lower end 21, the washing water W2 reflected by the lower end 21 of the garnish 20 reaches the lens 27. Hereby, the foreign objects or impurities are removed from the surface of the lens 27 by the washing water W1 and the washing water W2 at the high pressure. Further, as illustrated in FIG. 5, washing water W3 that is part of the washing water is temporarily accumulated in a space between the inner face (the front surface) of the lower end 21 and the jet port 31 of the camera jet nozzle 30. The washing water W3 has a hydraulic pressure to some extent. The washing water W3 is directed toward the lens 27 along the inner face of the lower end 21 and falls downward towards the lens 27, thus removing the foreign objects or impurities on the surface of the lens 27.

Thus, the foreign objects or impurities are removed from the lens 27 not only by the washing water W1 but also by the washing water W2 and the washing water W3. That is, although the washing water is dispersedly jetted from the jet port 31 of the camera jet nozzle 30, a ratio of the washing water that reaches the lens 27 with respect to the whole washing water thus jetted is high. In other words, the foreign objects or impurities on the surface of the lens 27 are cleaned efficiently by the washing water jetted from the camera jet nozzle 30.

When the occupant releases the hand from the cleaning switch 42, the cleaning switch 42 automatically returns to the OFF position. Hereby, the control device 40 stops sending the activating signal to the electric pump 38, so that the electric pump 38 stops. As a result, the washing water is not jetted from the camera jet nozzle 30 and the window jet nozzle 35.

The disclosure has been described based on the preferred embodiment, but the disclosure is not limited to the preferred embodiment, and various alterations can be made within a range that does not deviate from the object of the disclosure as will be shown below.

For example, as indicated by a virtual line (dashed lines) in FIGS. 1 and 2, the rear camera 55 different from the rear camera 25 and a camera jet nozzle 56 placed just above the rear camera 55 may be fixed to the outer surface of the outer panel 15. In this modification, the garnish 20, the camera jet nozzle 30, the water supply tube 37, the electric pump 38, the washing water tank 39, the control device 40, the cleaning switch 42, and the camera jet nozzle 56 are constituents of the camera cleaning device 50.

The rear camera 55 has the same structure as the rear camera 25 and the rear camera 55 is connected to the image processor. Note that an angle formed between the optical axis of a lens of the rear camera 55 and the horizontal direction is larger than θ1. Accordingly, the rear camera 55 captures an image of a ground (a road surface) in a region (e.g., a region distanced from the rear door 13 by 1 m to 2 m) short distance away from the rear door 13, for example. The image captured by the rear camera 55 is displayed on the display 41. That is, the rear camera 55 is used as a reverse parking camera. In other words, the rear camera 55 is suitable as a camera for a reverse parking camera. Note that, as the lens for the rear camera 55, a wide angle lens or a fisheye lens, for example, can be used. Further, the garnish 20 is placed just behind the rear camera 55, and the lower end 21 of the garnish 20 and the upper part of the lens of the rear camera 55 face each other in the front-rear direction. The lower end 21 of the garnish 20 is placed above the angle of view, that is, above the light reflected by a subject and incident on the lens of the rear camera 55.

The camera jet nozzle 56 has the same structure as the camera jet nozzle 30. A first end of a third branch tube 37c that is a part of the water supply tube 37 is connected to the camera jet nozzle 56. The garnish 20 is placed just behind the camera jet nozzle 56 such that the jet port of the camera jet nozzle 56 and the lower end 21 face each other via a very small gap formed therebetween. Accordingly, rearward exposure of the camera jet nozzle 56 is prevented by the garnish 20. This accordingly protects the camera jet nozzle 56 and prevents the appearance of the rear door 13 (and the vehicle 10) from being spoiled by the camera jet nozzle 56.

In this modification, foreign objects or impurities attached to the lens of the rear camera 55 are cleaned efficiently by washing water jetted from the camera jet nozzle 56.

Further, the camera cleaning device may include a detector that detects foreign objects or impurities when the foreign objects or impurities are attached to the lens 27 of the rear camera 25 and/or the lens of the rear camera 55, and when the detector detects foreign objects or impurities, the control device 40 may automatically operate the electric pump 38. In this modification, when foreign objects or impurities are attached to the lens 27 of the rear camera 25 and/or the lens of the rear camera 55, the foreign objects or impurities attached to the lens 27 of the rear camera 25 and/or the lens of the rear camera 55 are automatically removed by washing water. The detector may be a sensor that detects foreign objects or impurities or may be a program stored in the control device 40 and configured to determine whether foreign objects or impurities are attached or not based on imaging data.

By providing a switching valve on the water supply tube 37, for example, the washing water may be supplied selectively to the first branch tube 37a, the second branch tube 37b, and the third branch tube 37c.

Further, the rear camera 25 and the camera jet nozzle 30 may be integrated with each other. Similarly, the rear camera 55 and the camera jet nozzle 56 may be integrated with each other.

It is possible to only provide either the rear camera 25 or the rear camera 55 in the rear door 13.

Further, one camera having both a function of the rear camera 25 and a function of the rear camera 55 may be provided in the rear door 13. The camera can adjust the angle of view or focal length of a lens. Accordingly, by adjusting the angle of view or focal length of the camera, the camera can selectively capture an image of a subject placed within a range captured by the rear camera 25 and an image of a subject placed within a range captured by the rear camera 55.

The light incident on the lens of the rear camera 25, the lens of the rear camera 55, and/or the lens of the foregoing camera (having the function of the rear camera 25 and the function of the rear camera 55) may include reflection light reflected by a part of the garnish 20. In this case, it is preferable that the image processor processes imaging data so that the garnish 20 is not displayed on the display 41.

Further, the camera jet nozzle 30 may include an air jet port for jetting compressed air outside the camera jet nozzle 30. With such a configuration, when washing water jetted from the camera jet nozzle 30 remains on the surface of the lens 27, it is possible to remove the washing water thus remaining by the compressed air. Similarly, the camera jet nozzle 56 may include an air jet port for jetting compressed air outside the camera jet nozzle 56. With such a configuration, when washing water jetted from the camera jet nozzle 56 remains on the surface of the lens of the rear camera 55, it is possible to remove the washing water thus remaining by the compressed air.

What is claimed is:

1. A camera cleaning device provided at a vehicle rear door of a vehicle for a camera configured, to capture an image of a subject placed behind the vehicle, the camera being fixed to an outer panel constituting an outer surface of the vehicle rear door, the camera cleaning device comprising:

a jet nozzle being placed above a lens of the camera and being fixed to the outer panel, the jet nozzle being configured to dispersedly jet washing water toward the lens; and a garnish fixed to the outer panel so as to be placed on a rear side of the outer panel in a vehicle front-rear direction, wherein the jet nozzle is disposed between the outer panel and the garnish, wherein:

a surface on a front side of a lower end of the garnish in the vehicle front-rear direction faces the jet nozzle; and a shape of the garnish is configured such that the lens is placed on a virtual downwardly and forwardly extending extension line of the lower end of the garnish.

2. The camera cleaning device according to claim 1, wherein the lower end of the garnish is inclined so as to protrude towards an upper part of the lens.

3. The camera cleaning device according to claim 2, wherein the lower end of the garnish and the upper part of the lens face each other in the vehicle front-rear direction.

4. The camera cleaning device according to claim 2, wherein:

the jet nozzle is arranged above the lower end of the garnish; and the surface on the front side of the lower end of the garnish in the vehicle front-rear direction faces the jet nozzle such that a part of the washing water dispersedly jetted by the jet nozzle is reflected by the surface.

5. The camera cleaning device according to claim 2, wherein the jet nozzle, the lens and the lower end of the garnish are configured and arranged such that a first part of the washing water directly reaches the lens, a second part of the washing water is reflected towards the lens by the lower end of the garnish and a third part of the washing water is temporally accumulated in a space between the jet nozzle and the lower end of the garnish.

6. The camera cleaning device according to claim 2, wherein the garnish includes:

a main portion extending in an upward and downward direction in a side view of the vehicle; and the lower end, wherein the lower end includes a first inclined portion being inclined with respect to the main portion and a second inclined portion being inclined with respect to the main portion and with respect to the first inclined portion.

7. The camera cleaning device according to claim 2, wherein the garnish is configured and arranged so as to enclose the jet nozzle on a vehicle rearward side and at least partly on a vehicle downward side.

8. The camera cleaning device according to claim 2, wherein the lower end of the garnish and the lens are arranged such with respect to each other that the lower end of the garnish is above and outside an angle of view of the lens.

* * * * *